(12) United States Patent
Li et al.

(10) Patent No.: US 10,615,988 B2
(45) Date of Patent: Apr. 7, 2020

(54) COMPACT AND RELIABLE PHYSICAL UNCLONABLE FUNCTION DEVICES AND METHODS

(71) Applicant: QUALCOMM Incorporated, San Diego, CA (US)

(72) Inventors: Xia Li, San Diego, CA (US); Seung Hyuk Kang, San Diego, CA (US); Bin Yang, San Diego, CA (US); Gengming Tao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 15/877,630

(22) Filed: Jan. 23, 2018

(65) Prior Publication Data

US 2019/0229933 A1 Jul. 25, 2019

(51) Int. Cl.
*H04L 9/32* (2006.01)
*G06F 11/10* (2006.01)
*G11C 29/52* (2006.01)
*G06F 3/06* (2006.01)
*G11C 13/00* (2006.01)
*G06F 21/31* (2013.01)
*G11C 7/24* (2006.01)
*G11C 7/02* (2006.01)
*G11C 7/12* (2006.01)
*H04L 9/08* (2006.01)
*G06F 21/73* (2013.01)
(Continued)

(52) U.S. Cl.
CPC .............. *H04L 9/3278* (2013.01); *G06F 3/06* (2013.01); *G06F 11/1068* (2013.01); *G06F 21/31* (2013.01); *G06F 21/73* (2013.01); *G11C 7/02* (2013.01); *G11C 7/12* (2013.01); *G11C 7/24* (2013.01); *G11C 11/412* (2013.01); *G11C 11/419* (2013.01); *G11C 13/004* (2013.01); *G11C 29/52* (2013.01); *H04L 9/0866* (2013.01); *H04L 2209/12* (2013.01); *H04L 2209/805* (2013.01)

(58) Field of Classification Search
CPC ..... G09C 1/00; H04L 2209/12; H04L 9/3278; G06F 21/31; G11C 13/004
See application file for complete search history.

(56) References Cited

U.S. PATENT DOCUMENTS

2017/0365316 A1* 12/2017 Wang .................. G11C 11/1675
2018/0151224 A1* 5/2018 Chih .................... G11C 13/004

* cited by examiner

*Primary Examiner* — Olugbenga O Idowu
(74) *Attorney, Agent, or Firm* — Qualcomm Incorporated

(57) ABSTRACT

In certain aspects, an apparatus comprises a plurality of PUF cells. Each PUF cell comprises a first transistor in series with a first loading resistive component and coupled to a common cross-coupled node and cross-coupled to a complementary common cross-coupled node, a second transistor in series with a second loading resistive component and coupled to the complementary common cross-coupled node and cross-coupled to the common cross-coupled node, a first pass-gate and a second pass-gate coupled to a bit line and the complementary bit line, respectively. The apparatus further comprises an auxiliary peripheral circuit coupled to the bit line, the complementary bit line, the common cross-coupled node, and the complementary common cross-coupled node. During activation, the selected PUF cell, together with the auxiliary peripheral circuit, forms a cross-coupled inverter pair and outputs a physical unclonable function value.

25 Claims, 10 Drawing Sheets

(51) Int. Cl.
*G11C 11/412* (2006.01)
*G11C 11/419* (2006.01)

COMPACT AND RELIABLE PHYSICAL UNCLONABLE FUNCTION DEVICES AND METHODS

BACKGROUND

Field

Aspects of the present disclosure relate generally to devices and methods for generating physical unclonable functions, and more particularly, to compact and reliable devices and methods for generating physical unclonable functions.

Background

Mobile and embedded devices are becoming ubiquitous interconnected platforms for everyday tasks. Many such tasks require the mobile device to securely authenticate and be authenticated by another party and/or securely handle private information. Due to the inherent mobility of such devices, the threat model must include use cases where the device operates in an untrusted environment and the adversary has a degree of physical access to the system. Physical unclonable functions (PUFs) are a promising innovative primitive that are used for authentication and secret key storage without the requirement of secure EEPROMs and other expensive hardware. This is possible, because instead of storing secrets in digital memory, PUFs derive a secret from the physical characteristics of the integrated circuit (IC). A PUF is based on the idea that even though the mask and manufacturing process is the same among different ICs, each IC is actually slightly different due to normal manufacturing process variability.

The IoT market imposes a strong need to protect smart devices with very limited resources. It is often required for ICs to be able to perform operations such as authentication of devices, protection of confidential information, and secure communication in an inexpensive yet highly secure and reliable way. Accordingly, it would be beneficial to provide devices and methods for generating physical unclonable functions (PUFs) that reduce chip area and improve noise performance.

SUMMARY

The following presents a simplified summary of one or more implementations to provide a basic understanding of such implementations. This summary is not an extensive overview of all contemplated implementations, and is intended to neither identify key nor critical elements of all implementations nor delineate the scope of any or all implementations. The sole purpose of the summary is to present concepts relate to one or more implementations in a simplified form as a prelude to a more detailed description that is presented later.

In one aspect, an apparatus comprises a bit line, a complementary bit line, a common cross-coupled node, a complementary common cross-coupled node, and a plurality of PUF cells. Each PUF cell comprises a first transistor of a first type having a gate coupled to the complementary common cross-coupled node, a second transistor of the first type having a gate coupled to the common cross-coupled node, a first loading resistive component having a first terminal coupled to a drain of the first transistor and a second terminal coupled to the common cross-coupled node, a second loading resistive component having a third terminal coupled to a drain of the second transistor and a fourth terminal coupled to the complementary common cross-coupled node, a first pass-gate having one of a source and a drain coupled to the common cross-coupled node and another one of the source and the drain coupled to the bit line, and a second pass-gate having one of a source and a drain coupled to the complementary common cross-coupled node and another one of the source and the drain coupled to the complementary bit line. The apparatus further comprises an auxiliary peripheral circuit coupled to the bit line, the complementary bit line, the common cross-coupled node, and the complementary common cross-coupled node.

In another aspect, a method comprises equalizing voltages of a common cross-coupled node and a complementary common cross-coupled node by an auxiliary peripheral circuit in response to an assertion of an equalization control signal, wherein the common cross-coupled node and the complementary common cross-coupled node couple to a plurality of PUF cells. Each PUF cell comprises a first transistor of a first type having a gate coupled to the complementary common cross-coupled node, a second transistor of the first type having a gate coupled to the common cross-coupled node, a first loading resistive component having a first terminal coupled to a drain of the first transistor and a second terminal coupled to the common cross-coupled node, a second loading resistive component having a third terminal coupled to a drain of the second transistor and a fourth terminal coupled to the complementary common cross-coupled node, a first pass-gate having one of a source and a drain coupled to the common cross-coupled node, another one of the source and the drain coupled to a bit line and a gate coupled to a respective one of a plurality of word line control signal, and a second pass-gate having one of a source and a drain coupled to the complementary common cross-coupled node, another one of the source and the drain coupled to a complementary bit line, and a gate coupled to the respective one of the plurality of word line control signal. The method further comprises selecting one of the plurality of cells in response to an assertion of the respective one of the plurality of world line control signal, and outputting a physical unclonable function (PUF) value based on a mismatch between the transistors of the selected one of the plurality of PUF cells.

To accomplish the foregoing and related ends, one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

The detailed description set forth below, in connection with the appended drawings, is intended as a description of various aspects and is not intended to represent the only aspects in which the concepts described herein may be practiced. The detailed description includes specific details for the purpose of providing an understanding of the various concepts. However, it will be apparent to those skilled in the art that these concepts may be practiced without these specific details. In some instances, well-known structures and components are shown in block diagram form in order to avoid obscuring such concepts.

A physical unclonable function (PUF) is a physical entity that is embodied in a physical structure and is easy to evaluate but hard to predict. Further, an individual PUF device must be easy to make but practically impossible to duplicate, even given the exact manufacturing process that produces it. PUFs are usually implemented in integrated circuits (ICs) and are typically used in applications with high security requirements. A PUF is based on the idea that even though the mask and manufacturing process is the same among different ICs, each IC is actually slightly different due to normal manufacturing process variability. PUFs leverage this variability to derive "secret" information that is unique to the chip (a silicon "biometric"). In addition, due to the manufacturing process variability that defines the secret, one cannot manufacture two identical chips, even with full knowledge of the chip's design.

Figure 1:
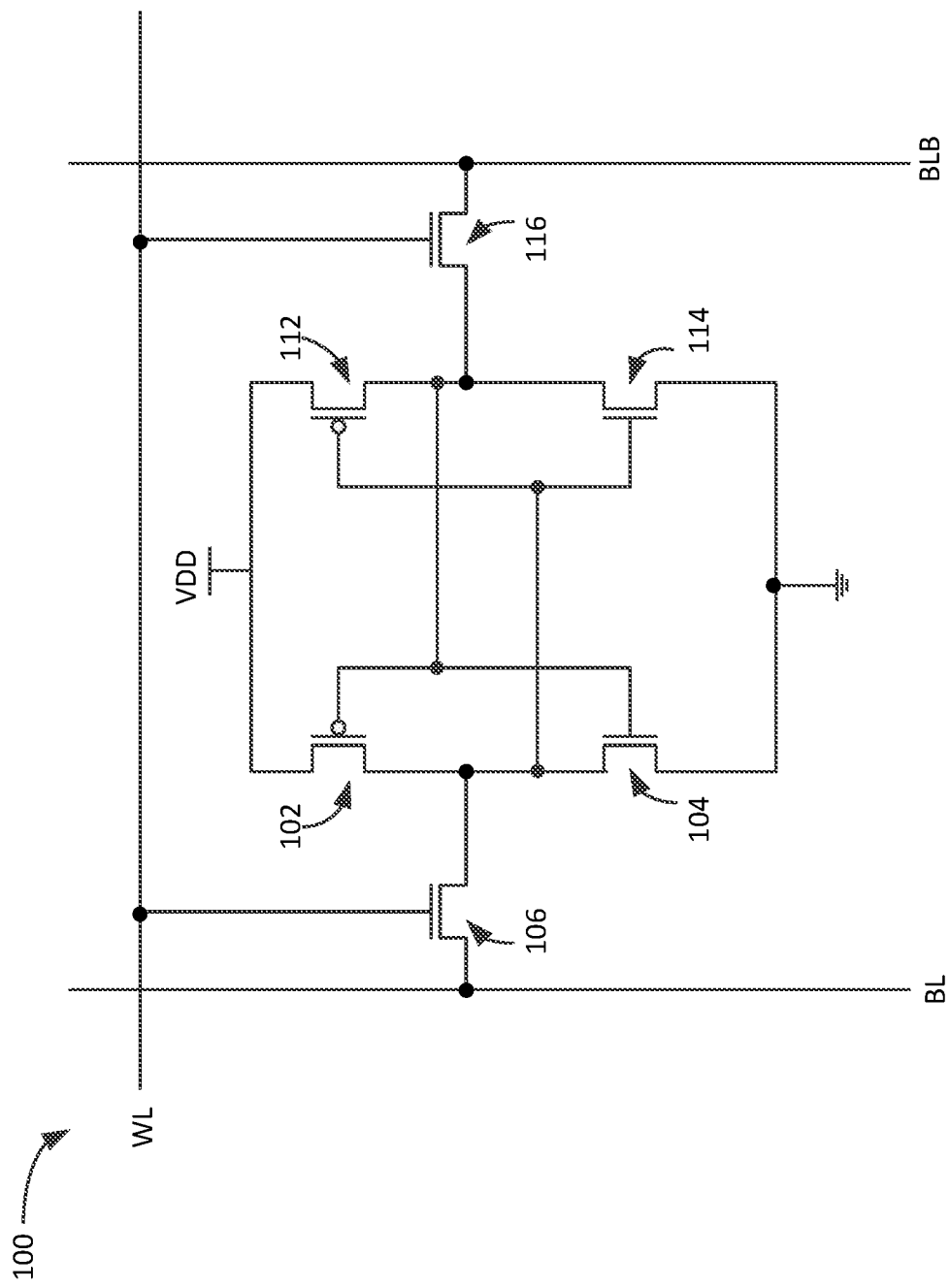
FIG. 1 illustrates an example SRAM PUF cell according to certain aspects of the present disclosure.

A popular PUF structure exploits the positive feedback loop in an SRAM or SRAM like structure shown in FIG. 1. FIG. 1 illustrates an example SRAM PUF cell according to certain aspects of the present disclosure. Like a regular 6T SRAM, the PUF cell 100 comprises a pair of cross-coupled inverters formed by PMOS transistors 102 and 112 and NMOS transistors 104 and 114. The PUF cell 100 also comprises two pass-gate NMOS transistors 106 and 116 coupled to a bit line BL and a complementary bit line BLB, respectively. Both pass-gate NMOS transistors 106 and 116 are controlled by a word line control signal WL. The PUF cell 100 has two stable states (used to store a logic 1 or a logic 0). The positive feedback by the cross-coupled inverters forces the PUF cell 100 into one of these two states after power-up. Once a steady state is reached, the positive feedback prevents the PUF cell 100 from transitioning out of this state accidentally. Theoretically, there are equal probability that the PUF cell 100 may enter logic 1 or logic 0 state. However, due to small transistor mismatch resulting from process variation, the PUF cell 100 is skewed toward a particular state after power-up and no write operation occurred. Although the SRAM PUF cell 100 is simple, it is sensitive to noise. Random noise or other small environmental fluctuations can cancel out or overwhelm the mismatch and result in an output bit flip, affecting the reliability of the cell. Error correction of this output is often necessary.

Figure 2:
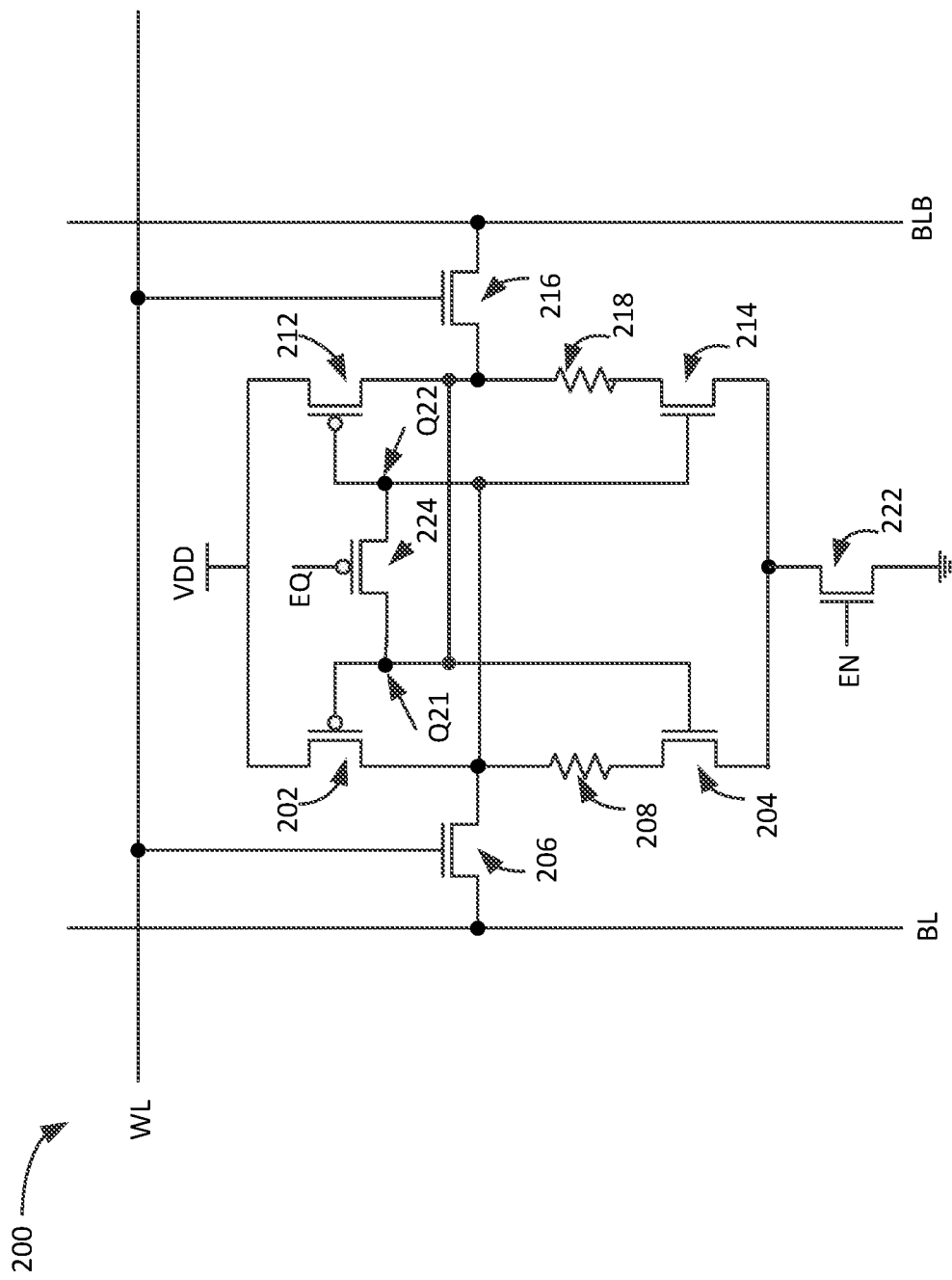
FIG. 2 illustrates another example SRAM PUF cell according to certain aspects of the present disclosure.

FIG. 2 illustrates another example SRAM PUF cell according to certain aspects of the present disclosure. Like PUF cell 100, the PUF cell 200 also comprises a pair of cross-coupled inverters formed by two PMOS transistors 202 and 212 and two NMOS transistors 204 and 214. The PUF cell 200 also comprises two pass-gate NMOS transistors 206 and 216 coupled to a bit line BL and a complementary bit line BLB, respectively. Both the pass-gate NMOS transistors 206 and 216 are controlled by a word line control signal WL. In addition, the PUF cell 200 includes a loading resistive component 208 in series with the PMOS transistor 202 and the NMOS transistor 204 and a loading resistive component 218 in series with the PMOS transistor 212 and the NMOS transistor 214. The PUF cell 200 further comprises an equalizer formed by PMOS transistor 224 coupled to an equalization control signal EQ and a read enable NMOS transistor 222 coupled to an enable control signal EN.

Figure 3:
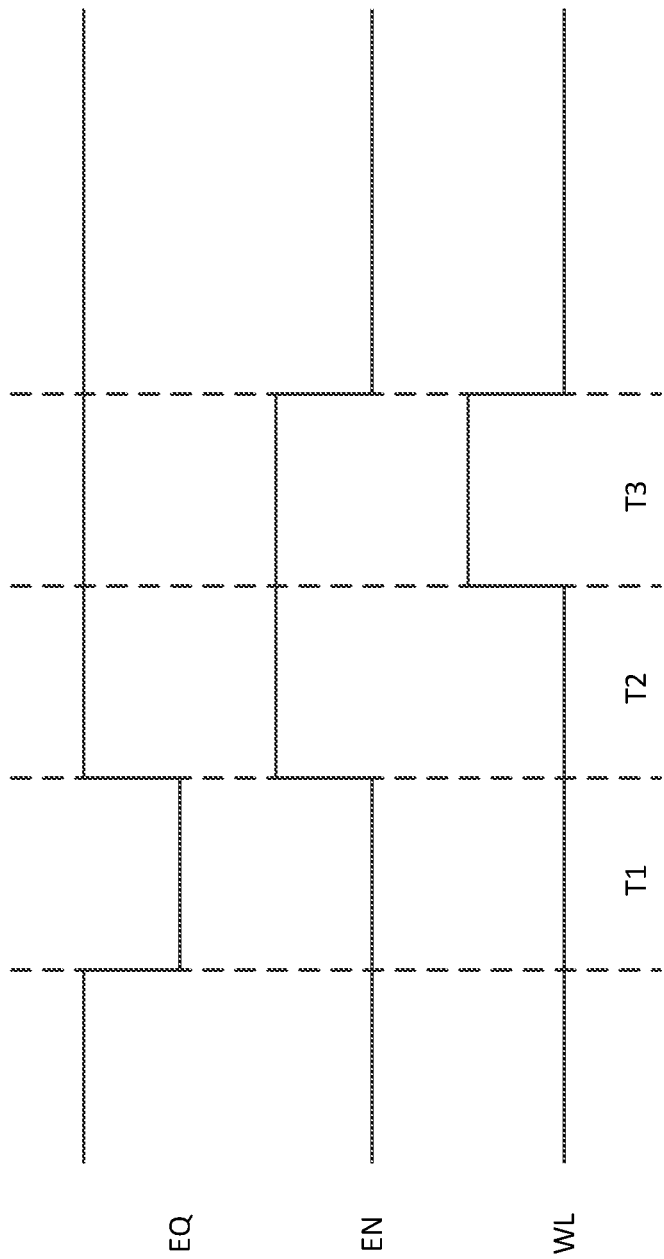
FIG. 3 illustrates example control signal waveforms for activating an SRAM PUF cell according to certain aspects of the present disclosure.

FIG. 3 illustrates example control signal waveforms for activating the PUF cell 200 according to certain aspects of the present disclosure. The equalization control signal EQ stays high during standby but turns low first during activation of the PUF cell 200. The activation of the PUF cell 200 starts in cycle T1. In cycle T1, the equalization control signal EQ becomes low. In response, the equalization transistor 224 turns on, coupling the outputs of the cross-coupled inverter pair Q21 and Q22 and bringing both outputs Q21 and Q22 to a same voltage level. Next, in cycle T2, the equalization control signal EQ goes back to high and the enable control signal EN turns high, enabling the outputs of cross-coupled inverter pair Q21 and Q22 to reach a steady state (a logic 1 or a logic 0). After a steady state is reached, in cycle T3, the word line control signal WL turns high and the steady state of the cross-coupled inverters is read out to the bit line BL and the complementary bit line BLB. The value of the bit line BL and the complementary bit line BLB is physical unclonable function (PUF) as the value is determined based on the mismatch of the transistors in PUF cells 200. As illustrated in FIG. 3, the read of the PUF value of the PUF cell 200 takes 3 cycles in total.

By adding the loading resistive components 208 and 218, the gains of the cross-coupled inverter pair increase. As a result, the mismatch between two NMOS transistors 204 and 214 is amplified more and becomes larger. The noise immunity of the PUF cell 200 is thus improved. However, the PUF cell 200 requires 8 transistors and 2 resistive components (8T-2R). The size of the PUF cell 200 is significantly larger than other types of PUF cells.

Figure 4:
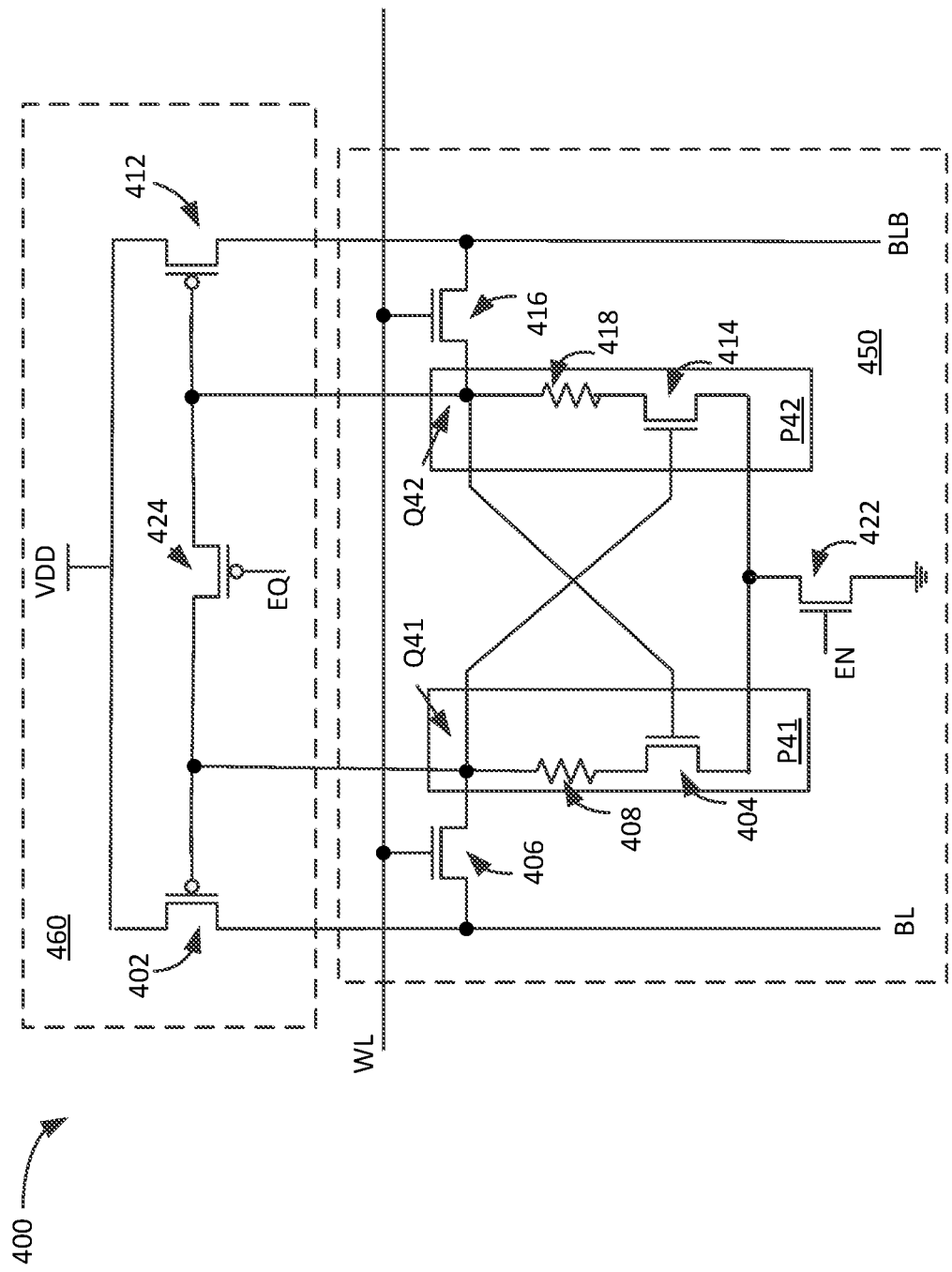
FIG. 4 illustrates an exemplary improved PUF cell according to certain aspects of the present disclosure.

FIG. 4 illustrates an exemplary improved PUF cell according to certain aspects of the present disclosure. The design 400 shows a portion of a PUF cell array, including a PUF cell 450 and an auxiliary peripheral circuit 460. The PUF cell 450 comprises two cross-coupled pull-down paths P41 and P42. The pull-down path P41 comprises an NMOS transistor 404 having the source coupled to an NMOS footer transistor 422 and the drain coupled to a first terminal of a loading resistive component 408. Likewise, the pull-down path P42 comprises an NMOS transistor 414 having the source coupled to the NMOS footer transistor 422 and the drain coupled to a first terminal of a loading resistive component 418. A second terminal of the loading resistive component 408 couples to a cross-coupled node Q41 and a second terminal of the loading resistive component 418 couples to a complementary cross-coupled node Q42. The cross-coupled node Q41 also couples to the gate of the NMOS transistor 414 while the complementary cross-coupled node Q42 couples to the gate of the NMOS transistor 404.

The PUF cell 450 further comprises two pass-gate NMOS transistors 406 and 416 with drains/sources couple to the cross-coupled node Q41 and the complementary cross-coupled node Q42, respectively. Another sources/drains of the pass-gate NMOS transistors 406 and 416 couple to a bit line BL and a complementary bit line BLB, respectively. The gates of the pass-gate NMOS transistors 406 and 416 both couple to a word line control signal WL.

In addition, the PUF cell 450 comprises the NMOS footer transistor 422. The NMOS footer transistor 422 has the source coupled to a ground, the drain coupled to both pull-down paths P41 and P42. The gate of the NMOS footer transistor 422 couples to an enable control signal EN.

Unlike the PUF cells 100 and 200, the PUF cell 450 does not contain pull-up PMOS transistors or equalization circuit. Instead, the equalization circuits and pull-up transistors are moved to the periphery to form the auxiliary peripheral circuit 460. The auxiliary peripheral circuit 460 is shared among multiple PUF cells within a same column in the PUF cell array. The auxiliary peripheral circuit 460 comprises two pull-up PMOS transistors 402 and 412 and an equalization PMOS transistor 424. The sources of the pull-up PMOS transistors 402 and 412 couple to a supply voltage Vdd. The drains of the pull-up PMOS transistors 402 and 412 couple to the bit line BL and the complementary bit line BLB, respectively. The gates of the pull-up PMOS transistors 402 and 412 couple to the source and the drain of the equalization PMOS transistor 424, respectively. In addition, the drain and source of the equalization PMOS transistor 424 (also the gates of the pull-up PMOS transistors 402 and 412) couple to the cross-coupled node Q41 and the complementary cross-coupled node Q42, respectively. The gate of the equalization PMOS transistor 424 couples to an equalization control signal EQ. By moving the pull-up PMOS transistors and the equalization circuit to the periphery, the PUF cell 450 comprises 5 transistors and 2 resistive components (5T-2R) compared to 8 transistors and 2 resistive components (8T-2R) for the PUF cell 200. Significant area saving is achieved.

The loading resistive components 408 and 418 may be passive resistors made of diffusion, metal, polysilicon, or other suitable materials. The loading resistive components 408 and 418 may be programmable where the resistances of the loading resistive components 408 and 418 may be adjusted for appropriate gains or for mismatching purpose. Other alternatives are possible. For example, MRAM or RRAM may be used as the loading resistive components 408 and 418. The resistance of MRAM or RRAM may be programmed. A typical resistance of the loading resistive components 408 and 418 is in the range of 0.25-4 KΩ.

Figure 5:
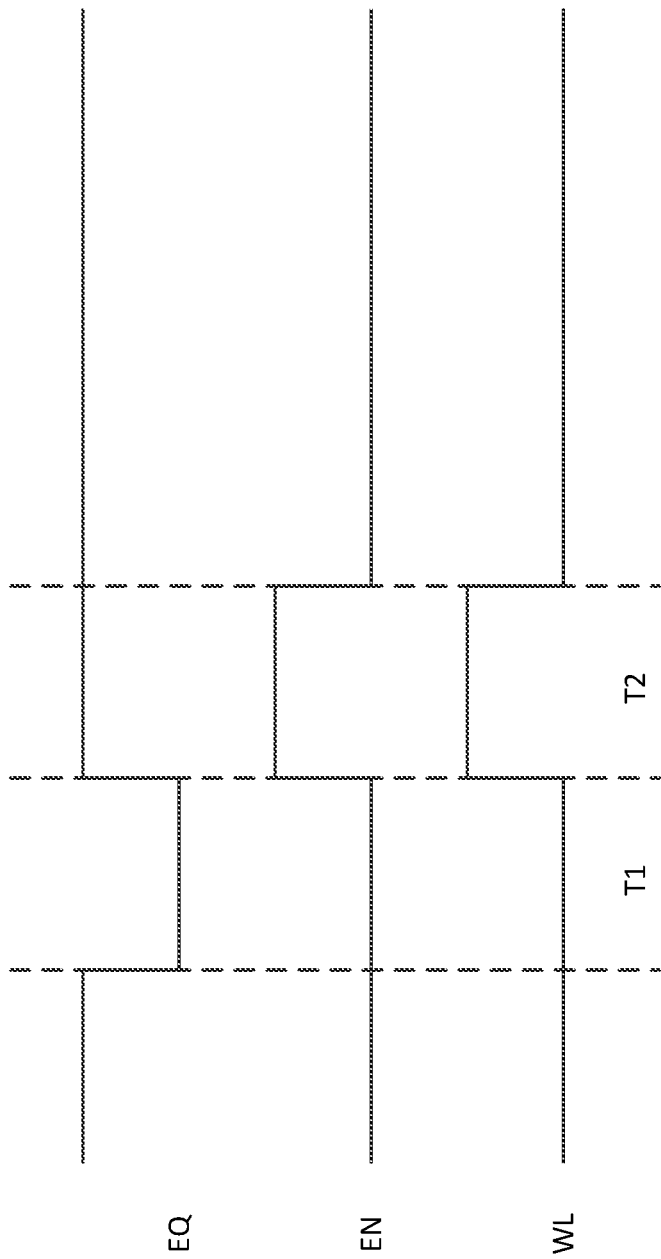
FIG. 5 illustrates exemplary control signal waveforms for activating an improved PUF cell according to certain aspects of the present disclosure.

FIG. 5 illustrates exemplary control signal waveforms for activating the PUF cell 450 according to certain aspects of the present disclosure. During standby, the equalization control signal EQ stays high, the word line control signal stays low, and the enable control signal stays low. The activation of the PUF cell 450 starts at cycle T1. In cycle T1, the equalization control signal EQ becomes low, the equalization PMOS transistor 424 turns on, coupling the cross-coupled node Q41 and the complementary cross-coupled node Q42 and bringing the cross-coupled node Q41 and the complementary cross-coupled node Q42 to a same voltage level. Next, in cycle T2, the equalization control signal EQ goes back to high and both the enable control signal EN and the word line control signal WL turn high. The NMOS footer transistor 422 and the pass-gate NMOS transistors 406 and 416 are all turned on. As a result, a cross-coupled inverter pair is formed. One inverter is formed by the PMOS transistor 402 and the NMOS transistor 404 with the loading resistive component 408. Another is formed by the PMOS transistor 412 and the NMOS transistor 414 with the loading resistive component 418. The positive feedback formed by the cross-coupled inverter pair drives the cross-coupled node Q41 and the complementary cross-coupled node Q42 to a steady state (one at logic 1 and one at logic 0). The stead state at the cross-coupled node Q41 and the complementary cross-coupled node Q42 further couples to the bit line BL and the complementary bit line BLB, respectively, through the pass-gates NMOS transistors 406 and 416.

The value of the bit line BL and the complementary bit line BLB is physical unclonable function (PUF) as the value is determined based on the mismatch of the transistors in PUF cells 450. The loading resistive components 408 and 418 improve the gains of the cross-coupled inverter pair. The mismatch is amplified more due to the gain improvement compared to a cell without the loading resistive components. Consequently, the noise immunity of the PUF cell 450 is improved.

The read of the PUF value from the PUF cell 450 takes 2 cycles versus 3 cycles for PUF cell 200, leading to faster activation. In addition, as illustrated in FIG. 5, the waveforms of the word line control signal WL and the enable control signal EN are identical. Therefore, these two control signals may be one signal, eliminating the need to generate an additional control signal, resulting in a simpler design, smaller area for the control signal generation, and lower power consumption.

Figure 6:
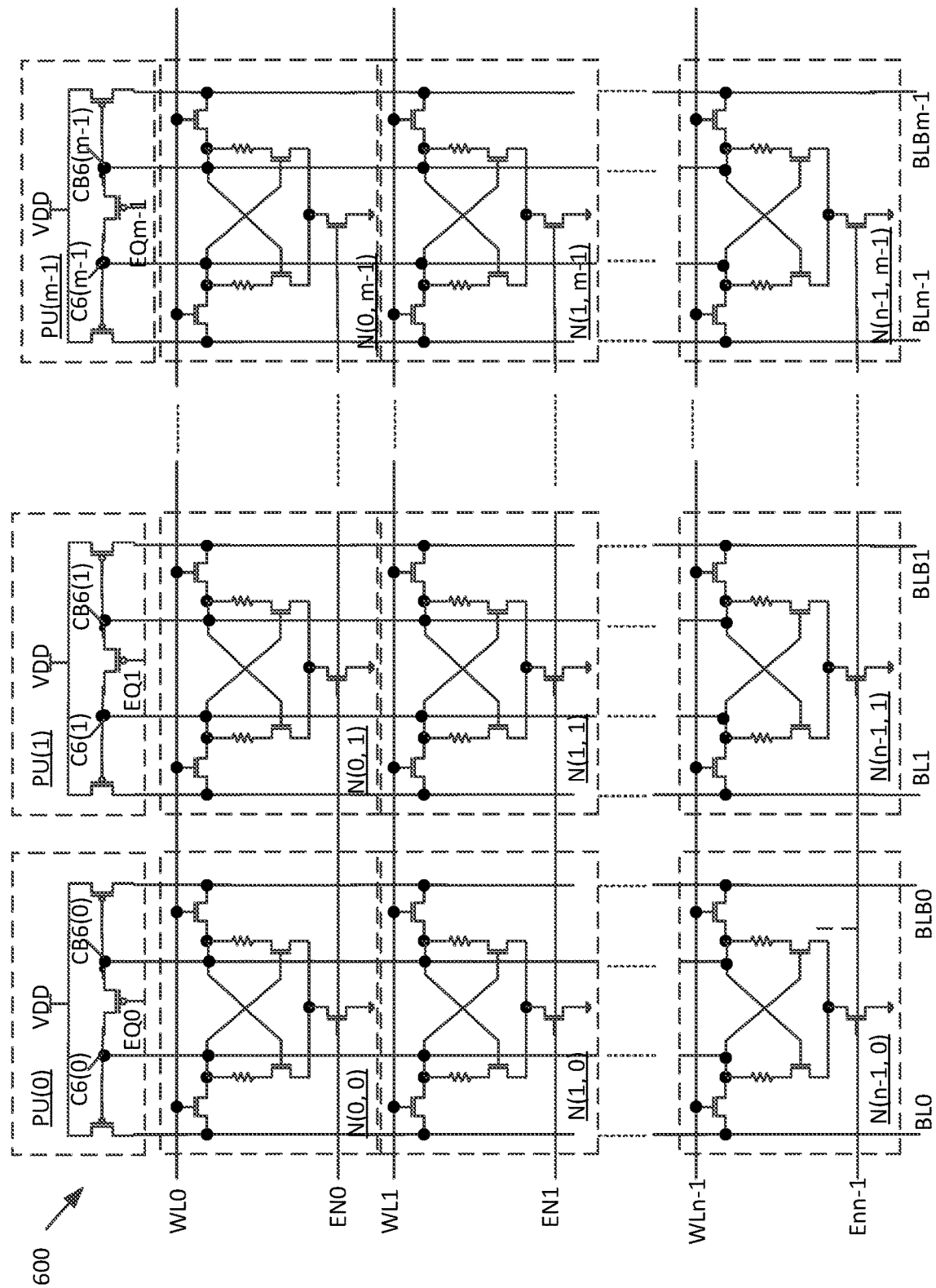
FIG. 6 illustrates an exemplary improved PUF cell array according to certain aspects of the present disclosure.

FIG. 6 illustrates an exemplary improved PUF cell array according to certain aspects of the present disclosure. The array 600 comprises n×m PUF cells N(0, 0), N(0, 1), . . . , N(n−1, m−1). Each of the PUF cells N(0, 0), N(0, 1), . . . , N(n−1, m−1) is same as the PUF cell 450 in FIG. 4. The array 600 further comprises m auxiliary peripheral circuits PU(0), PU(1), . . . , PU(m−1). Each of the auxiliary peripheral circuits PU(0), PU(1), . . . , PU(m−1) is same as the auxiliary peripheral circuit 460. The control signals to the array 600 include n word line control signals, WL0 WL1, WLn−1; n enable control signals EN0, EN1, . . . , ENn−1; and m equalization control signals EQ0, EQ1, . . . , EQm−1. PUF values are read out from the array 600 through bit lines BL0, BL1, BLm−1 and respective complementary bit lines BLB0, BLB1, BLBm−1.

The n×m PUF cells N(0, 0), N(0, 1), . . . N(n−1, m−1) are arranged in n rows and m columns. The PUF cells in each row share a same word line control signal and a same equalization control signal. For example, the PUF cells N(0, 0), N(0, 1), . . . N(0, m−1) in the first row couple to the same word line control signal WL0 and enable control signal EN0; the PUF cells N(1, 0), N(1, 1), . . . N(1, m−1) in the second row couple to the same word line control signal WL1 and enable control signal EN1; while the PUF cells N(n−1, 0), N(n−1, 1), . . . N(n−1, m−1) in the nth row couple to the same word line control signal WLn−1 and enable control signal ENn−1. The PUF cells in each column couple to a same bit line and a same corresponding complementary bit line. For example, the PUF cells N(0, 0), N(1, 0), . . . , N(n−1, 0) in the first column couple to the same bit line BL0 and the same complementary bit line BLB0; the PUF cells N(0, 1), N(1, 1), . . . , N(n−1, 1) in the second column couple to the same bit line BL1 and the same complementary bit line BLB1; while the PUF cells N(0, m−1), N(1, m−1), ..., N(n−1, m−1) in the mth column couple to the same bit line BLm−1 and the same complementary bit line BLBm−1.

In addition, all the PUF cells in one column share a respective one of the auxiliary peripheral circuits PU(0), PU(1), ..., PU(m−1). For example, the PUF cells N(0, 0), N(1, 0), ..., N(n−1, 0) in the first column all couple to and share the auxiliary peripheral circuit PU(0); the PUF cells N(0, 1), N(1, 1), ..., N(n−1, 1) in the second column all couple to and share the auxiliary peripheral circuit PU(1); while the PUF cells N(0, m−1), N(1, m−1), ..., N(n−1, m−1) in the mth column all couple to and share the auxiliary peripheral circuit PU(m−1). Each of the auxiliary peripheral circuits PU(0), PU(1), ..., PU(m−1) couples to and is controlled by a respective one of the equalization control signals EQ0, EQ1, ..., EQm−1. As a result of sharing the respective one of the auxiliary peripheral circuits PU(0), PU(1), ..., PU(m−1) for the PUF cells in a column, the cross-coupled nodes of all PUF cells in the same column are coupled together to form a common cross-coupled node. Likewise, the complementary cross-coupled nodes of all PUF cells in the same column are coupled together to form a complementary common cross-coupled node. For example, the cross-coupled nodes of all PUF cells in the first column N(0, 0), N(1, 0), ..., N(n−1, 0) couple to each other to form a common cross-coupled node C6(0), the cross-coupled nodes of all PUF cells in the second column N(0, 1), N(1, 1), ..., N(n−1, 1) couple to each other to form a common cross-coupled node C6(1), the cross-coupled nodes of all PUF cells in the mth column N(0, m−1), N(1, m−1), ..., N(n−1, m−1) couple to each other to form a common cross-coupled node C6(m−1), the complementary cross-coupled nodes of all PUF cells in the first column N(0, 0), N(1, 0), ..., N(n−1, 0) couple to each other to form a complementary common cross-coupled node CB6(0), the complementary cross-coupled nodes of all PUF cells in the second column N(0, 1), N(1, 1), ..., N(n−1, 1) couple to each other to form a complementary common cross-coupled node CB6(1), and the complementary cross-coupled nodes of all PUF cells in the mth column N(0, m−1), N(1, m−1), N(n−1, m−1) couple to each other to form a complementary common cross-coupled node CB6(m−1).

Although the array 600 comprises additional m auxiliary peripheral circuits PU(0), PU(1), ..., PU(m−1), each of the PUF cells N(0, 0), N(0, 1), ... N(n−1, m−1) comprises only 5 transistors and 2 resistive components (5T-2R). Area saving is achieved overall compared to array using PUF cells 200.

During standby, all the equalization control signals EQ0, EQ1, ..., EQm−1 stay high, all the word line control signals WL0 WL1, WLn−1 stay low, and all the enable control signals EN0, EN1, ENn−1 stay low. An auxiliary peripheral circuit may be shared among the PUF cells in the same column because only one PUF cell in the column may be selected by applying appropriate word line control signals and enable control signals. For example, if the PUF cell N(1, 1) is to be selected, the equalization control signals EQ1 is asserted and turns low. In response to the assertion of the equalization control signal EQ1, the common cross-coupled node C6(1) and the complementary common cross-coupled node CB6(1) couple and reach a same voltage level. Next, the equalization control signal EQ1 is de-asserted and the common cross-coupled node C6(1) and the complementary common cross-coupled node CB6(1) decouple. The word line control signal WL1 and the enable control signal EN1 are asserted by turning both signals high. The assertion of both the word line control signal WL1 and the enable control signals EN1 couples the selected PUF cell N(1, 1) with the auxiliary peripheral circuit PU(1). A cross-coupled inverter pair is thus formed by the PMOS transistors in the auxiliary peripheral circuit PU(1) and by the NMOS transistors in the PUF cell N(1, 1). The positive feedback formed by the cross-coupled inverter pair drives the common cross-coupled node C6(1) and the complementary common cross-coupled node CB6(1) to a steady state (one at logic 1 and one at logic 0). The stead state at the common cross-coupled node C6(1) and the complementary common cross-coupled node CB6(1) further couples to the bit line BL1 and the complementary bit line BLB1 through the pass-gates of the PUF cell N(1, 1). A physical unclonable function (PUF) value based on a mismatch between the transistors of the selected PUF cells N(1, 1) is thus generated and read out.

If the PUF cells from the same row in all columns are to be access simultaneously, then the equalization control signals EQ0, EQ1, ..., EQm−1 may go to logic high or low simultaneously. The equalization control signals EQ0, EQ1, ..., EQm−1 may be shorted together and merged into one signal equalization control signal.

Figure 7:
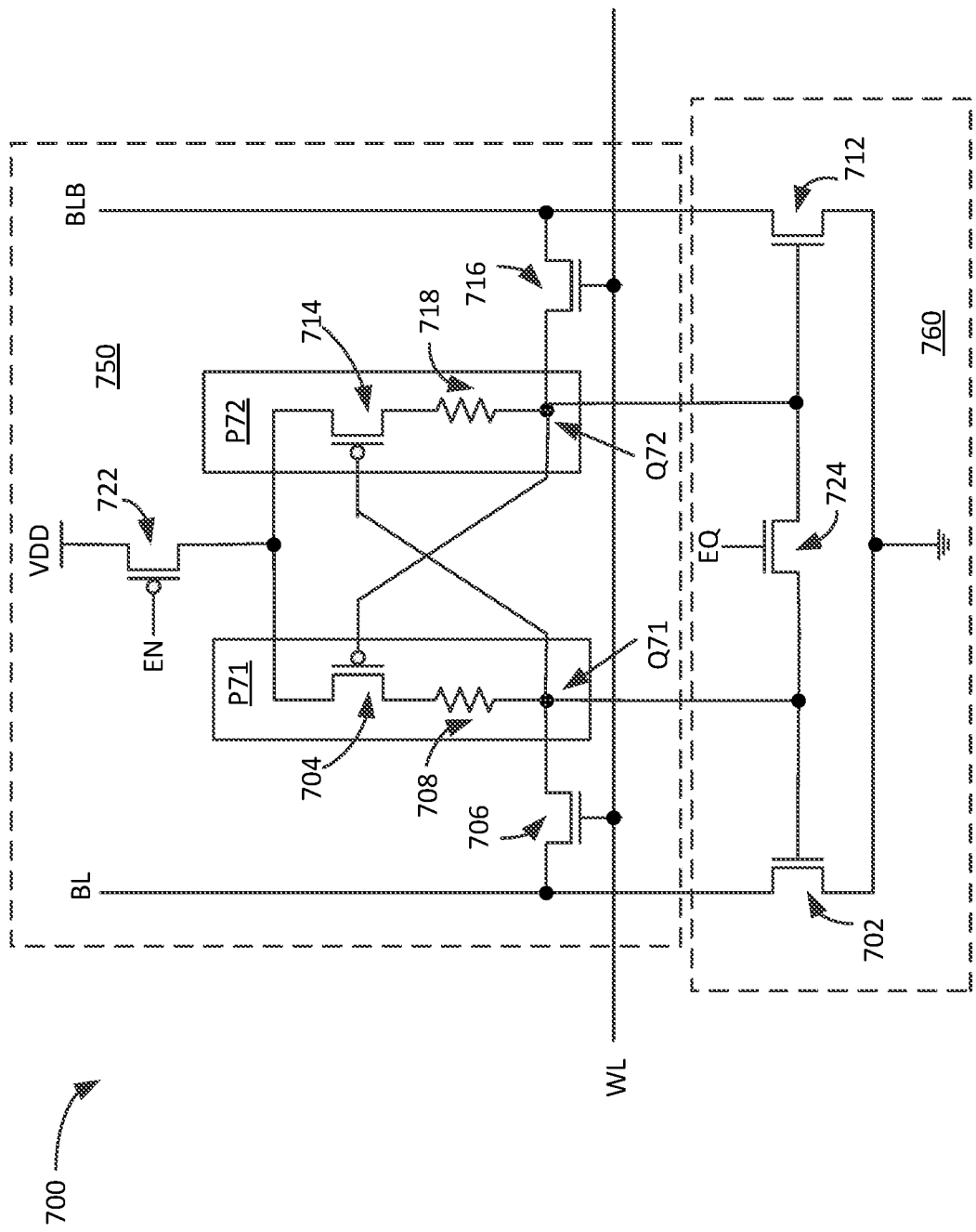
FIG. 7 illustrates another exemplary improved PUF cell according to certain aspects of the present disclosure.

FIG. 7 illustrates another exemplary improved PUF cell according to certain aspects of the present disclosure. The design 700 shows a portion of a PUF cell array, including a PUF cell 750 and an auxiliary peripheral circuit 760. The PUF cell 750 comprises two cross-coupled pull-up paths P71 and P72. The pull-up path P71 comprises a PMOS transistor 704 having the source coupled to a PMOS header transistor 722 and the drain coupled to a first terminal of a loading resistive component 708. Likewise, the pull-up path P72 comprises a PMOS transistor 714 having the source coupled to the PMOS header transistor 722 and the drain coupled to a first terminal of a loading resistive component 718. A second terminal of the loading resistive component 708 couples to a cross-coupled node Q71 and a second terminal of the loading resistive component 718 couples to a complementary cross-coupled node Q72. The cross-coupled node Q71 also couples to the gate of the PMOS transistor 714 while the complementary cross-coupled node Q72 couples to the gate of the PMOS transistor 704.

The PUF cell 750 further comprises two pass-gate NMOS transistors 706 and 716 with drains/sources couple to the cross-coupled nodes Q71 and the complementary cross-coupled node Q72, respectively. Another sources/drains of the pass-gate NMOS transistors 706 and 716 couple to a bit line BL and a complementary bit line BLB, respectively. The gates of the pass-gate NMOS transistors 706 and 716 both couple to a word line control signal WL.

In addition, the PUF cell 750 comprises a PMOS header transistor 722. The PMOS header transistor 722 has the source coupled to a supply voltage Vdd, the drain coupled to both pull-up paths P71 and P72. The gate of the PMOS header transistor 722 couples to an enable control signal EN.

The PUF cell 750 does not contain pull-down NMOS transistors or equalization circuit. Instead, the equalization circuit and pull-down transistors are moved to the periphery to form the auxiliary peripheral circuit 760. The auxiliary peripheral circuit 760 is shared among multiple PUF cells within a same column. The auxiliary peripheral circuit 760 comprises two pull-down NMOS transistors 702 and 712 and an equalization NMOS transistor 724. The sources of the pull-down NMOS transistors 702 and 712 couple to a ground. The drains of the pull-down NMOS transistors 702 and 712 couple to the bit line BL and the complementary bit line BLB, respectively. The gates of the pull-down NMOS transistors 702 and 712 couple to the source and the drain of the equalization NMOS transistor 724, respectively. In addition, the drain and source of the equalization NMOS transistor 724 (also the gates of the pull-down NMOS transistors 702 and 712) couple to the cross-coupled nodes Q71 and the complementary cross-coupled node Q72, respectively. The gate of the equalization NMOS transistor 724 couples to an equalization control signal EQ. The PUF cell 750 comprises 5 transistors and 2 resistive components (5T-2R) compared to 8 transistors and 2 resistive components (8T-2R) for the PUF cell 200. Significant area saving is achieved.

Like the loading resistive components 408 and 418, the loading resistive components 708 and 718 may be passive resistors made of diffusion, metal, polysilicon, or other suitable materials. The loading resistive components 708 and 718 may be programmable where the resistances of the loading resistive components 708 and 718 may be adjusted for appropriate gain or for enhanced mismatching purpose. Other alternatives are possible. For example, MRAM or RRAM may be used as the loading resistive components 708 and 718. The resistance of MRAM or RRAM may be programmed. A typical resistance of the loading resistive component 708 and 718 is in the range of 0.25-4 KΩ.

Figure 8:
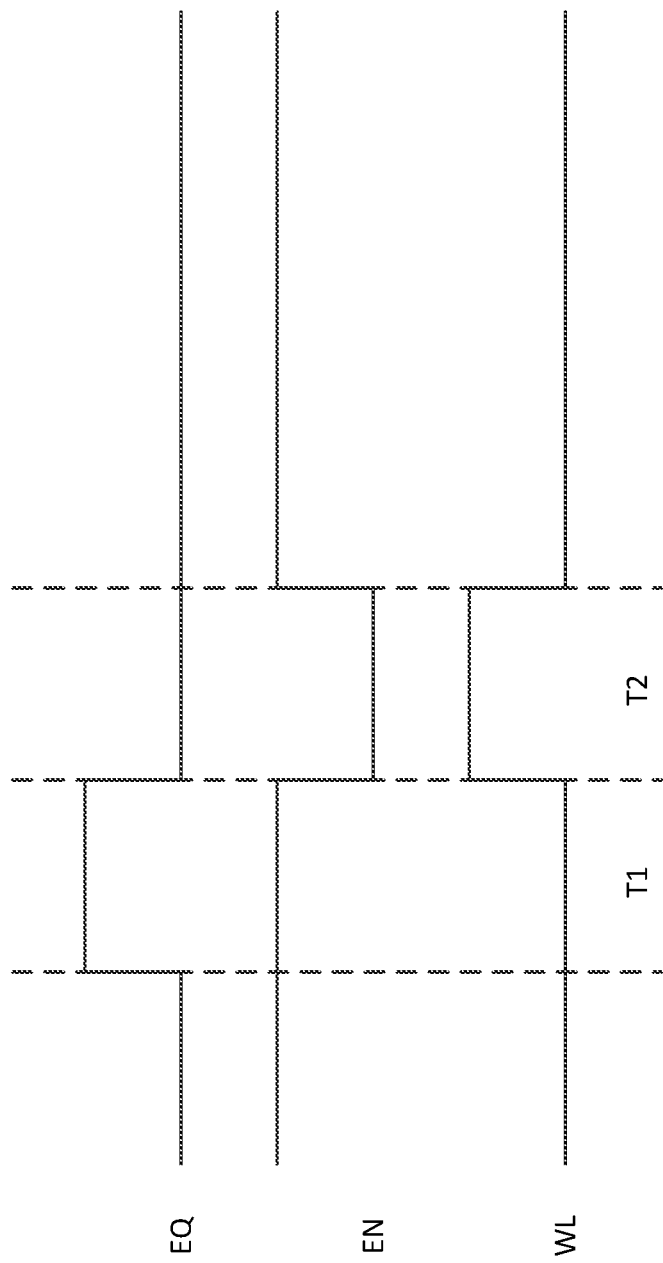
FIG. 8 illustrates another exemplary control signal waveforms for activating an improved PUF cell according to certain aspects of the present disclosure.

FIG. 8 illustrates exemplary control signal waveforms for activating the PUF cell 750 according to certain aspects of the present disclosure. During standby, the equalization control signal EQ stays low, the word line control signal stays low, and the enable control signal stays high. The activation of the PUF cell 750 starts in cycle T1. In cycle T1, the equalization control signal EQ becomes high, the equalization NMOS transistor 724 turns on, coupling the cross-coupled nodes Q71 and the complementary cross-coupled node Q72 and bringing the cross-coupled node Q71 and the complementary cross-coupled node Q72 to a same voltage level. Next, in cycle T2, the control signal EQ goes back to low and the enable control signal EN turns low and the word line control signal WL turns high. The PMOS header transistor 722 and the pass-gate NMOS transistors 706 and 716 are all turned on. As a result, a cross-coupled inverter pair is formed. One inverter is formed by the NMOS transistor 702 and the PMOS transistor 704 with the loading resistive component 708. Another is formed by the NMOS transistor 712 and the PMOS transistor 714 with the loding resistive component 718. The positive feedback formed by the cross-coupled inverter pair drives the cross-coupled nodes Q71 and the complementary cross-coupled node Q72 to a steady state (one at logic 1 and one at logic 0). The stead state at the cross-coupled node Q71 and the complementary cross-coupled node Q72 further couples to the bit line BL and the complementary bit line BLB, respectively, through the pass-gates NMOS transistors 706 and 716.

The value of the bit line BL and the complementary bit line BLB is physical unclonable function (PUF) as the value is determined based on the mismatch of the transistors and loading resistances in PUF cells 750. The loading resistive components 708 and 718 improves the gains of the cross-coupled inverter pair. The mismatch is amplified more due to the gain improvement compared to a cell without the loading resistive components. Consequently, the noise immunity of the PUF cell 750 is improved.

The read of the PUF value from the PUF cell 750 takes 2 cycles versus 3 cycles for PUF cell 200, leading to faster activation. In addition, as illustrated in FIG. 8, the waveforms of the word line control signal WL and the enable control signal EN are complementary. Therefore, one may be generated by inverting the other, resulting in simpler design, smaller area for the control signal generation, and lower power consumption.

Figure 9:
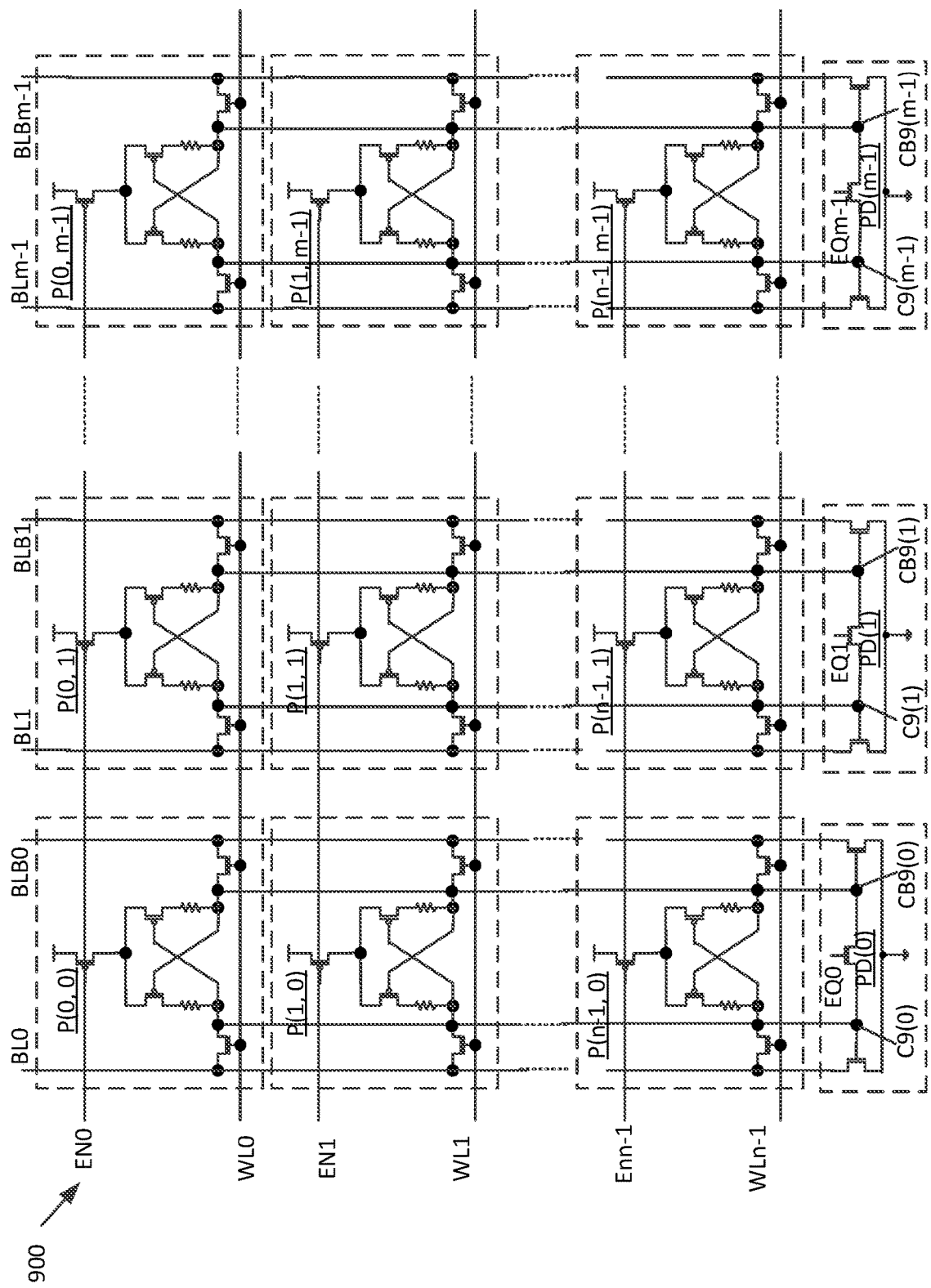
FIG. 9 illustrates another exemplary improved PUF cell array according to certain aspects of the present disclosure.

FIG. 9 illustrates another exemplary improved PUF cell array according to certain aspects of the present disclosure. The array 900 comprises n×m PUF cells P(0, 0), P(0, 1), . . . , P(n–1, m–1). Each of the PUF cells P(0, 0), P(0, 1), . . . , P(n–1, m–1) is same as the PUF cell 750 in FIG. 7. The array 900 further comprises m auxiliary peripheral circuits PD(0), PD(1), PD(m–1). Each of the auxiliary peripheral circuits PD(0), PD(1), PD(m–1) is same as the auxiliary peripheral circuit 760. The control signals to the array 900 include n word line control signals, WL0 WL1, WLn–1; n enable control signals EN0, EN1, . . . , ENn–1; and m equalization control signals EQ0, EQ1, . . . , EQm–1. PUF values are read out from the array 900 through bit lines BL0, BL1, BLm–1 and respective complementary bit lines BLB0, BLB1, BLBm–1. The m equalization control signals EQO, EQ1, . . . , EQm–1 may be shorted together to become one shared equalization signal if all cells in the same row are to be accessed simultaneously.

The n×m PUF cells P(0, 0), P(0, 1), . . . P(n–1, m–1) are arranged inn rows and m columns. The PUF cells in each row share a same word line control signal and a same equalization control signal. For example, the PUF cells P(0, 0), P(0, 1), . . . P(0, m–1) in the first row couple to the same word line control signal WL0 and enable control signal EN0; the PUF cells P(1, 0), P(1, 1), . . . P(1, m–1) in the second row couple to the same word line control signal WL1 and enable control signal EN1; while the PUF cells P(n–1, 0), P(n–1, 1), . . . P(n–1, m–1) in the nth row couple to the same word line control signal WLn–1 and enable control signal ENn–1. The PUF cells in the same column couple to a same bit line and a same respective complementary bit line. For example, the PUF cells P(0, 0), P(1, 0), . . . , P(n–1, 0) in the first column couple to the same bit line BL0 and the same complementary bit line BLB0; the PUF cells P(0, 1), P(1, 1), . . . , P(n–1, 1) in the second column couple to the same bit line BL1 and the same complementary bit line BLB1; while the PUF cells P(0, m–1), P(1, m–1), . . . , P(n–1, m–1) in the mth column couple to the same bit line BLm–1 and the same complementary bit line BLBm–1.

In addition, all the PUF cells in one column share a respective one of the auxiliary peripheral circuits PD(0), PD(1), PD(m–1). For example, the PUF cells P(0, 0), P(1, 0), . . . , P(n–1, 0) in the first column all couple to and share the auxiliary peripheral circuit PD(0); the PUF cells P(0, 1), P(1, 1), . . . , P(n–1, 1) in the second column all couple to and share the auxiliary peripheral circuit PD(1); while the PUF cells P(0, m–1), P(1, m–1), . . . , P(n–1, m–1) in the mth column all couple to and share the auxiliary peripheral circuit PD(m–1). Each of the auxiliary peripheral circuits PD(0), PD(1), PD(m–1) couples to and is controlled by a respective one of the equalization control signals EQ0, EQ1, . . . , EQm–1. As a result of sharing a respective one of the auxiliary peripheral circuits PD(0), PD(1), PD(m–1), the cross-coupled nodes of all PUF cells in the same column are coupled together to form a common cross-coupled node. Likewise, the complementary cross-coupled nodes of all PUF cells in the same column are coupled together to form a complementary common cross-coupled node. For example, the cross-coupled nodes of all PUF cells in the first column P(0, 0), P(1, 0), . . . , P(n–1, 0) couple to each other to form a common cross-coupled node C9(0), the cross-coupled nodes of all PUF cells in the second column P(0, 1), P(1, 1), . . . , P(n–1, 1) couple to each other to form a common cross-coupled node C9(1), the cross-coupled nodes of all PUF cells in the mth column P(0, m–1), P(1, m–1), . . . , P(n–1, m–1) couple to each other to form a common cross-coupled node C9(m–1), the complementary cross-coupled nodes of all PUF cells in the first column P(0, 0), P(1, 0), . . . , P(n−1, 0) couple to each other to form a complementary common cross-coupled node CB9(0), the complementary cross-coupled nodes of all PUF cells in the second column P(0, 1), P(1, 1), . . . , P(n−1, 1) couple to each other to form a complementary common cross-coupled node CB9(1), and the complementary cross-coupled nodes of all PUF cells in the mth column P(0, m−1), P(1, m−1), . . . , P(n−1, m−1) couple to each other to form a complementary common cross-coupled node CB9(m−1).

Although the array 900 comprises additional m auxiliary peripheral circuits PD(0), PD(1), . . . , PD(m−1), each of the PUF cells P(0, 0), P(0, 1), . . . P(n−1, m−1) comprises only 5 transistors and 2 resistive components (5T-2R). Area saving is achieved overall compared to array using PUF cells 200.

During standby, all the equalization control signals EQ0, EQ1, . . . , EQm−1 stay low, all the word line control signals WL0 WL1, WLn−1 stay low, and all the enable control signals EN0, EN1, ENn−1 stay high. An auxiliary peripheral circuit may be shared among the PUF cells in the same column because only one PUF cell in the column may be selected by applying appropriate word line control signals and the enable control signals. For example, if the PUF cell P(1, 1) is to be selected, the equalization control signals EQ1 is asserted and turns high. In response to the assertion of the equalization control signal EQ1, the common cross-coupled node C9(1) and the complementary common cross-coupled node CB9(1) couple and reach to a same voltage level. Next, the equalization control signal EQ1 is de-asserted and the common cross-coupled node C9(1) and the complementary common cross-coupled node CB9(1) decouple. The word line control signal WL1 and the enable control signal EN1 are asserted by turning the word line control signal WL1 high and the enable control signals EQ1 low. The assertion of both the word line control signal WL1 and the enable control signals EN1 couples the selected PUF cell P(1, 1) with the auxiliary peripheral circuit PD(1). A cross-coupled inverter pair is thus formed by the NMOS transistors in the auxiliary peripheral circuit PD(1) and by the PMOS transistors in the PUF cell P(1, 1). The positive feedback formed by the cross-coupled inverter pair drives the common cross-coupled node C9(1) and the complementary common cross-coupled node CB9(1) to a steady state (one at logic 1 and one at logic 0). The stead state at the common cross-coupled node C9(1) and the complementary common cross-coupled node CB9(1) further couples to the bit line BL1 and the complementary bit line BLB1 through the pass-gates of the PUF cell P(1, 1). A physical unclonable function (PUF) value based on a mismatch between the devices and loading resiatnce of the selected PUF cells P(1, 1) is thus generated and read out.

Figure 10:
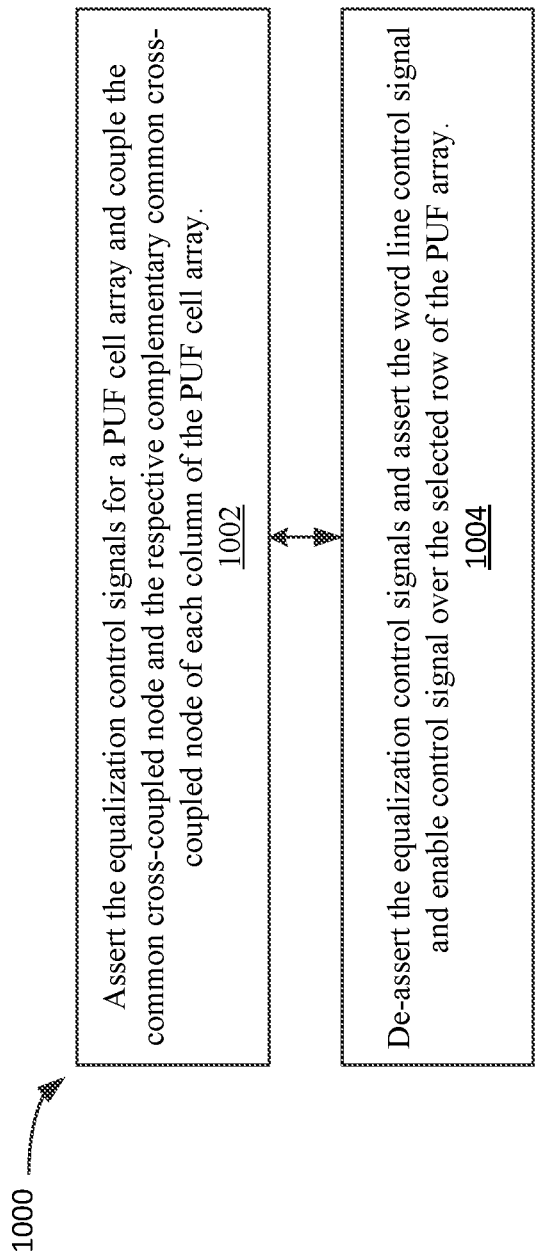
FIG. 10 illustrates a method of operating an improved PUF cell array according to certain aspects of the present disclosure.

FIG. 10 illustrates a method of operating a PUF cell array according to certain aspects of the present disclosure. The method 1000 applies to the PUF cells array to read out a PUF value. The PUF value may be multiple bits (e.g., the number of bit is same as the number of columns of the PUF cell array). The PUF cell array may be the array 600 or the array 900. The PUF cell array comprises n×m PUF cells (e.g., each cell being the PUF cell 450 or 750) arranged in n rows and m columns. The PUF cells in each row share a same word line control signal (e.g., WL0 for the first row, WL1 for the second row, . . . , and WLn−1 for the nth row) and a same equalization control signal (e.g., EQ0 for the first row, EQ1 for the second row, . . . , and EQn−1 for the nth row). The PUF cells in a same column couple to a same bit line and a same corresponding complementary bit line (e.g., BL0 and BLB0 for the first column, BL1 and BLB1 for the second column, . . . , and BLm−1 and BLBm−1 for the mth column) and a same common cross-coupled node and a same complementary common cross-coupled node (e.g., for the array 600, C6(0) and CB6(0) for the first column, C6(1) and CB6(1) for the second column, . . . , and C6(m−1) and CB6(m−1) for the mth column, while for the array 900, C9(0) and CB9(0) for the first column, C9(1) and CB9(1) for the second column, . . . , and C9(m−1) and CB9(m−1) for the mth column). In addition, all the PUF cells in a column share a respective one of a plurality of auxiliary peripheral circuits (e.g., each being the auxiliary peripheral circuit 460 or 760). Each of the plurality of auxiliary peripheral circuits couples to and is controlled by a respective one of a plurality of equalization control signals (e.g., EQ0 for the first column, EQ1 for the second column, . . . , and EQn−1 for the mth column).

During standby, appropriate control signals apply to the PUF cell array. For example, for the array 600, the equalization control signals stay high, the word line control signals stay low, and the enable control signals stay low. For the array 900, the equalization control signals stay low, the word line control signals stay low, and the enable control signals stay high.

The activation starts at 1002. At 1002, all of the plurality of equalization control signals are asserted (e.g., turning the plurality of equalization control signals to low for the array 600 or high for the array 900). In response to the assertion of the plurality of equalization control signals, the common cross-coupled node and the respective complementary common cross-coupled node of each column reach to a same voltage level.

At 1004, the plurality of equalization control signals is de-asserted. The common cross-coupled node and the respective complementary common cross-coupled node of each column are thus decoupled. A row is selected by asserting one of the plurality of word line control signals and a corresponding one of the plurality of enable control signals (e.g., turning the one of the plurality of word line control signals high and the corresponding one of the plurality of enable control signals high for the array 600 and turning the one of the plurality of word line control signals high and the corresponding one of the plurality of enable control signals low for the array 900). For example, if the second row is selected, then the word line control signal WL1 and the enable control signal EN1 are asserted (e.g., for the array 600, the word line control signal WL1 turns high and the enable control signal EN1 turns high, while for the array 900, the word line control signal WL1 turns high and the enable control signal EN1 turns low).

The assertion of both the one of the word line control signals and the corresponding one of the enable control signals enables the forming of a cross-coupled inverter pair in each column. The cross-coupled inverter pair in each column is formed by the PUF cells in the selected row and the corresponding auxiliary peripheral circuit (e.g., for the array 600, one inverter is formed by the PMOS transistor 402 and the NMOS transistor 404 with the loading resistive component 408 and another is formed by the PMOS transistor 412 and the NMOS transistor 414 with the loading resistive component 418 as illustrated in FIG. 4, while for the array 900, one is formed by the NMOS transistor 702 and the PMOS transistor 704 with the loading resistive component 708 and another is formed by the NMOS transistor 712 and the PMOS transistor 714 with the loading resistive component 718 as illustrated in FIG. 7). The positive feedback formed by the cross-coupled inverter pair drives the common cross-coupled node and the complementary common cross-coupled node in each column to a steady state (one at logic 1 and one at logic 0). The stead state at the common cross-coupled node and the complementary common cross-coupled node in each column couple to the bit line and the complementary bit line in each column through the pass-gates of the PUF cell in the selected row. A physical unclonable function (PUF) value based on a mismatch between the transistors and loading resistances of the PUF cells in the selected row is thus generated and read out.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus, comprising:
   a plurality of PUF cells each having:
   a first transistor of a first type having a gate coupled to a second node;
   a second transistor of the first type having a gate coupled to a first node;
   a first loading resistive component having a first terminal coupled to a drain of the first transistor and a second terminal coupled to the first node;
   a second loading resistive component having a third terminal coupled to a drain of the second transistor and a fourth terminal coupled to the second node;
   a first pass-gate having one of a source and a drain coupled to the first node and another one of the source and the drain coupled to a first line; and
   a second pass-gate having one of a source and a drain coupled to the second node and another one of the source and the drain coupled to a second line; and
   an auxiliary peripheral circuit coupled to the first line, the second line, the first node, and the second node, wherein the auxiliary peripheral circuit comprises transistors of a second type.

2. The apparatus of claim 1, wherein both the first pass-gate and the second pass-gate of each of the plurality of PUF cells couple to a respective one of a plurality of word line control signals.

3. The apparatus of claim 2, wherein the auxiliary peripheral circuit is configured to equalize a voltage level of the first node and the second node in response to an assertion of an equalization control signal.

4. The apparatus of claim 3, wherein the auxiliary peripheral circuit is configured to couple the first line or the second line to a supply voltage or a ground in response to an assertion of the respective one of the plurality of word line control signals.

5. The apparatus of claim 4, wherein the auxiliary peripheral circuit comprises
   a third transistor of the second type having a drain coupled to the first line;
   a fourth transistor of the second type having a drain coupled to the second line; and
   a fifth transistor of the second type having a drain and a source coupled to gates of the third and fourth transistors, respectively and a gate coupled to the equalization control signal.

6. The apparatus of claim 2, wherein each of the plurality of PUF cells further comprises an enable transistor of the first type having a drain coupled to sources of the first and second transistors and a gate coupled to a respective one of a plurality of enable control signals.

7. The apparatus of claim 6, wherein the respective one of the plurality of enable control signals and the respective one of the plurality of word line control signal are the same signal.

8. The apparatus of claim 6, wherein the respective one of the plurality of enable control signals is complementary to the respective one of the plurality of word line control signals.

9. The apparatus of claim 1, wherein the first type is NMOS and the second type is PMOS.

10. The apparatus of claim 9, wherein the sources of the first transistor and the second transistor of each of the plurality PUF cells are configured to couple to a ground in response to an assertion of an enable control signal.

11. The apparatus of claim 1, wherein the first type is PMOS and the second type is NMOS.

12. The apparatus of claim 11, wherein the sources of the first transistor and the second transistor of each of the plurality cells are configured to couple to a supply voltage in response to an assertion of an enable control signal.

13. The apparatus of claim 1, wherein one of the plurality of PUF cells is configured to be selected to output a physical unclonable function (PUF) value based on a mismatch of transistors of the selected one of the plurality of PUF cells.

14. The apparatus of claim 13, wherein the physical unclonable function (PUF) value is provided in the first line and the second line.

15. The apparatus of claim 14, wherein the value in the first line and the value in the second line are complementary.

16. A method, comprising:
   equalizing voltages of a first node and a second node by an auxiliary peripheral circuit in response to an assertion of an equalization control signal, wherein the auxiliary peripheral circuit comprises transistors of a second type and wherein the first node and the second node couple to a plurality of PUF cells each having:
   a first transistor of a first type having a gate coupled to the second node;
   a second transistor of the first type having a gate coupled to the first node;
   a first loading resistive component having a first terminal coupled to a drain of the first transistor and a second terminal coupled to the first node;
   a second loading resistive component having a third terminal coupled to a drain of the second transistor and a fourth terminal coupled to the second node;
   a first pass-gate having one of a source and a drain coupled to the first node, another one of the source and the drain coupled to a first line and a gate coupled to a respective one of a plurality of word line control signals; and
   a second pass-gate having one of a source and a drain coupled to the second node, another one of the source and the drain coupled to a second line, and a gate coupled to the respective one of the plurality of word line control signals;
   selecting one of the plurality of PUF cells in response to an assertion of the respective one of the plurality of word line control signals; and
   outputting a physical unclonable function (PUF) value based on a mismatch between transistors of the selected one of the plurality of PUF cells.

17. The method of claim 16, wherein the auxiliary peripheral circuit comprises
- a third transistor of the second type having a drain coupled to the first line;
- a fourth transistor of the second type having a drain coupled to the second line; and
- a fifth transistor of the second type having a drain and a source coupled to gates of the third and fourth transistors, respectively and a gate coupled to the equalization control signal.

18. The method of claim 16, wherein the auxiliary peripheral circuit is configured to couple the first line or the second line to a supply voltage or a ground in response to the assertion of the respective one of the plurality of word line control signals.

19. The method of claim 16, wherein each of the plurality of PUF cells further comprises an enable transistor of the first type having a drain coupled to sources of the first and second transistors and a gate coupled to a respective one of a plurality of enable control signals.

20. The method of claim 19, wherein the respective one of the plurality of enable control signals and the respective one of the plurality of word line control signals are the same signal.

21. The method of claim 19, wherein the respective one of the plurality of enable control signals is complementary to the respective one of the plurality of word line control signals.

22. The method of claim 16, wherein the first type is NMOS and the second type is PMOS.

23. The method of claim 22, wherein the sources of the first transistor and the second transistor of each of the plurality PUF cells are configured to couple to a ground in response to an assertion of an enable control signal.

24. The method of claim 16, wherein the first type is PMOS and the second type is NMOS.

25. The method of claim 24, wherein the sources of the first transistor and the second transistor of each of the plurality cells are configured to couple to a supply voltage in response to an assertion of an enable control signal.

* * * * *